United States Patent [19]

Fisher et al.

[11] 3,823,415

[45] July 9, 1974

[54] ROTARY MAGNETIC HEAD APPARATUS HAVING AN AIR-BEARING SUPPORTED HEAD WHEEL

[75] Inventors: Gene A. Fisher, Lafayette; Donovan M. Janssen; David Stedman, both of Boulder, all of Colo.

[73] Assignee: International Business Machines Corporation, Armonk, N.Y.

[22] Filed: Apr. 11, 1973

[21] Appl. No.: 350,303

[52] U.S. Cl. .................. 360/102, 360/107, 360/108
[51] Int. Cl. ............................................ G11b 5/52
[58] Field of Search ............... 179/100.2 T, 100.2 P; 340/174.1 E; 178/6.6 A

[56] References Cited

UNITED STATES PATENTS

| | | | |
|---|---|---|---|
| 3,293,359 | 12/1966 | Yasudka et al. | 179/100.2 T |
| 3,349,385 | 10/1967 | Studley | 340/174.1 E |
| 3,414,683 | 12/1968 | Dolby | 179/100.2 T |
| 3,420,964 | 1/1969 | Haas | 179/100.2 T |

*Primary Examiner*—Bernard Konick
*Assistant Examiner*—Robert S. Tupper
*Attorney, Agent, or Firm*—Francis A. Sirr

[57] ABSTRACT

Rotating head apparatus, for use in magnetic tape recording and/or reproduction, having an annular rotor or head wheel which is air-bearing supported radially and in opposing axial direction. The rotor itself physically supports a magnetic head, a power transformer secondary winding, electric amplifier means, a motor rotor, the movable member of a rotary signal transformer, and the movable member of an optical speed transducer. The rotor is positioned within an annular cavity formed by two mandrel halves. These mandrel halves are mounted in accurate end-to-end alignment at a joint forming a portion of the cavity. The cavity wall includes the motor stator, the stationary member of both the rotary signal transformer and the speed transducer, and air-blowing jets which supply the rotor-supporting air bearing. Thus, the annular rotor rotates with no physical engagement to the mandrel halves or the various means carried thereby.

23 Claims, 8 Drawing Figures

ROTARY MAGNETIC HEAD APPARATUS HAVING AN AIR-BEARING SUPPORTED HEAD WHEEL

BACKGROUND AND SUMMARY OF THE INVENTION

This invention relates to the field of magnetic telegraphophones, and more specifically to magnetic tape units employing one or more rotating heads which record and/or reproduce machine-convertible information while moving in transducing relationship with a magnetic web or tape, this information being oriented as magnetic domains to form information tracks which extend generally transverse to the longitudinal tape length.

Rotating head apparatus for use in magnetic tape units are widely known. In one form a generally cylindrical mandrel or drum includes a rotating head wheel which carries one or more read/write heads. The magnetic tape engages the mandrel at one point, makes a helical wrap about at least a portion of the mandrel, and exits the mandrel at a point which is both axially and circumferentially spaced from the entrance point. The angle of helical tape wrap can vary in accordance with design choice, but is usually between 180° and 360°. The head wheel rotates so as to sweep its magnetic heads transversely across the tape. The angle at which the head enters and exits the tape may vary, in accordance with design choice, from slightly less than 90° to a small angle, such as 15°.

Another form of device is one wherein the head wheel is associated with a tape guiding structure which bends the tape transversely into an arcuate shape that conforms to the circumferential shape of the head wheel. In this device the tape travels in a generally straight line past the head wheel, and is transversely bent by the associated guides as it enters the head wheel area.

The present invention finds utility with either aforementioned type of device, and has been found particularly useful with the helical wrap device.

A major problem encountered in the aforementioned devices is that of establishing and maintaining accurate positional alignment between the circumference of the head wheel and the associated mandrel halves which establish the shape of the flexible tape wrap in a transducing relationship to the rapidly moving head. The present invention solves this problem by constructing the two mandrel halves so that they are rigidly attached, end-to-end, at a joint which forms a portion of an annular cavity. This cavity includes air bearings which totally support an annular head wheel. This structure insures accurate alignment of the two mandrel halves as well as accurate air bearing alignment of the head wheel with the tape support or wrap plane established by the mandrel halves.

While air bearing support of a rotating member is known in the magnetic transducing arts, the structure of the present invention whereby the head wheel cavity is formed by the joining of two mandrel halves provides a marked improvement in that art.

Other features of the present invention include forming the head wheel cavity so as to include the stator of an electric motor, the stationary portion of a signal communicating or coupling means, and the stationary portion of a speed transducer. Ideally, both the signal communicating means and the speed transducer are of the type which do not include physical contact between the movable and stationary portions, for example, a rotary signal transformer and an optical digital tachometer, respectively.

A further feature of the present invention concerns itself with the use of an induction motor to produce rotation of the head wheel, including accurate servo control of the head wheel's speed to a steady-state value which is less than synchronous with the motor's rotating field speed, for example one-half the speed thereof, and the use of a power transformer secondary winding, physically carried by the rotor and magnetically coupled to the stator, to supply operating power to read/write electronic circuits carried by the rotor and interconnecting the magnetic head to the secondary winding of the rotary signal transformer.

The foregoing and other features and advantages of the invention will be apparent from the following more particular description of preferred embodiments of the invention, as illustrated in the accompanying drawing.

DESCRIPTION OF THE PREFERRED EMBODIMENTS

Figure 1:
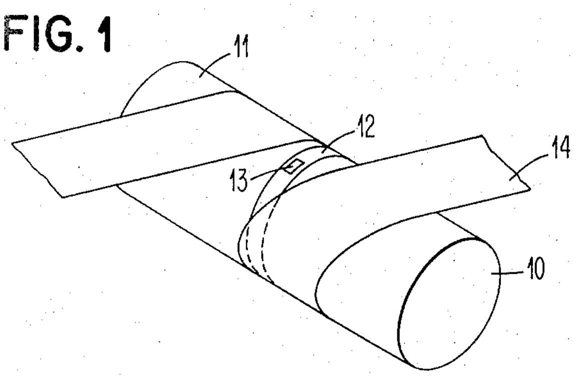
FIG. 1 shows a rotary magnetic head apparatus of the helical tape wrap type embodying the present invention.

FIG. 1 shows a rotary magnetic head apparatus in accordance with the present invention wherein a helical wrap of flexible magnetic recording tape is formed about a generally cylindrical mandrel. This mandrel is formed by portions or halves 10 and 11 which are mounted to a base or support structure by means not shown. These two mandrel halves are generally circular in cross section. The outer cylindrical surface of the two mandrel portions must be maintained in accurate axial alignment. As will be apparent from the following description, mandrel portions 10 and 11 are mechanically joined so as to form an annular cavity adjacent the joint site. A ring-shaped member 12, in the form of a rotary head wheel, is accurately mounted in this cavity, in positional alignment with the cylindrical plane established by mandrel portions 10 and 11. Head wheel 12 carries one or more magnetic heads or transducers 13. Head 13 sweeps a transverse path across magnetic tape 14, from one edge to the other. As is well known to those of ordinary skill in the art to which the present invention pertains, tape 14 may be continuously moved, or may be moved in step-by-step or incremental fashion. Furthermore, head 13 may be selectively controlled to write and/or read magnetic domain information while in transducing relationship with the magnetic oxide surface of tape 14, this surface being the surface of the tape which is immediately adjacent mandrel 10–11. Ideally, the rotational speed of head wheel 12 is accurately maintained at a steady state value, for example from 200 to 600 surface inches per second. Magnetic transducer 13 may include a read transducer which reads tape position information provided by prerecorded longitudinal servo data formed along one or both longitudinal edges of tape 14. Ideally, transducer 13 "flies" relative to the oxide surface of tape 14, the air film therebetween being maintained by hydrostatic or hydrodynamic means so as to establish a lubricating air film of small magnitude, for example a few microinches. By way of example, transducer 13 may be constructed in accordance with the teachings of the copending application of F. R. Freeman, R. W. Golz and W. K. Taylor, Ser. No. 318,973, filed Dec. 27, 1972, commonly assigned.

Figure 2:
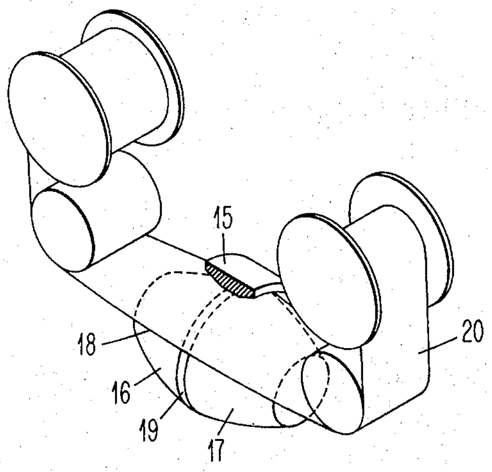
FIG. 2 shows a rotary magnetic head apparatus of the transverse bend tape wrap type embodying the present invention.

While the apparatus of FIG. 1 shows a helical tape wrap of approximately 360°, that of FIG. 2 shows a similar rotary magnetic head apparatus wherein a U-shaped guide 15, shown in cross section, forms transverse bend in the tape, to cause tape 20 to wrap approximately 180° about a mandrel formed by portions 16 and 17. The longitudinal edges of the tape, as it is bent by guide 15, form a trough, generally identified by reference numeral 18. As with the apparatus of FIG. 1, mandrel 16–17 includes a head wheel 19 which cooperates in transducing relationship with the oxide surface of magnetic recording tape 20.

Within the teachings of the present invention, the mandrel 10–11 of FIG. 1 and mandrel 17–18 of FIG. 2 may take a variety of shapes. Each mandrel portion includes a surface which must be maintained in accurate axial alignment with a corresponding surface of the other mandrel portion, since these two mandrel portions, and the intermediate head wheel, establish a critical interface plane adapted to receive the wrap of flexible magnetic recording tape. This tape-to-mandrel interface may include hydrostatic air bearing configurations as well as tape guides, to maintain an optimum transducing relationsip between the head wheel's magnetic transducer and the tape's oxide surface. Structural refinements of this type are not disclosed in FIGS. 1 and 2 since they are well known to those of ordinary skill in the art.

Figure 3:
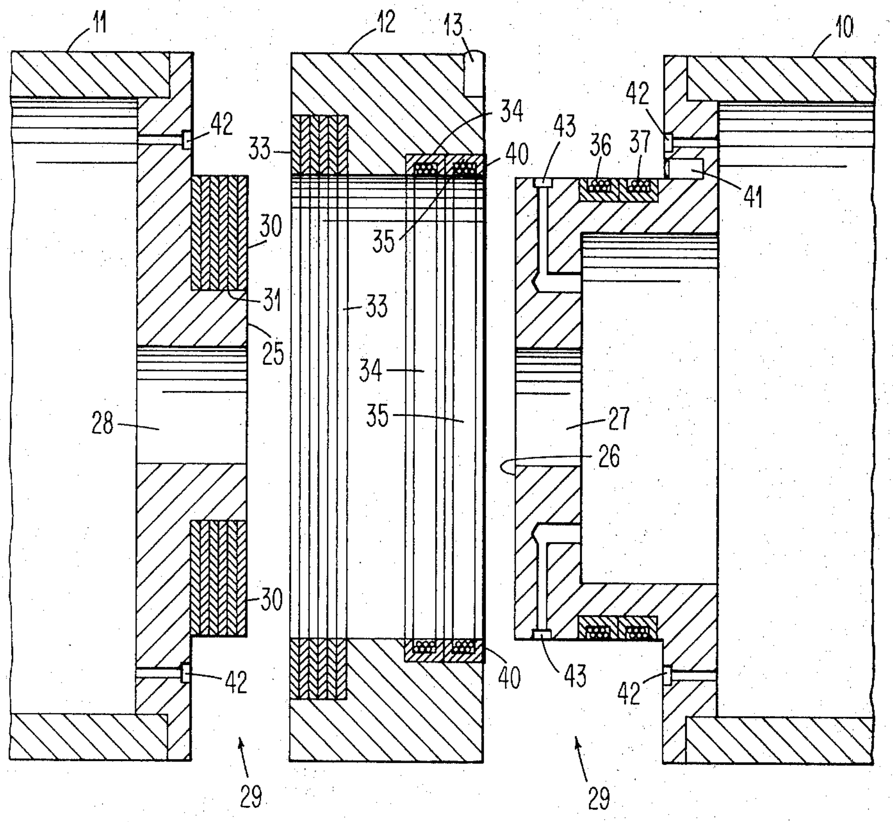
FIG. 3 is an exploded section view showing portions of the two mandrel halves and the rotor or head wheel of the apparatus of FIG. 1.

FIG. 3 is an exploded, longitudinal section view showing the central portion of the mandrel 10–11 and head wheel 12 of FIG. 1. From this view it can be seen that the rotating head apparatus of the present invention, which is adapted to support a wrap of magnetic recording tape, as shown, for example in FIGS. 1 and 2, includes first and second aligned mandrel sections 10 and 11 of generally similar shape to define a tape supporting surface. In this case, these aligned portions are cylinders, circular in cross section. The mandrel sections 10 and 11 are coupled together to form a joint site at surfaces 25 and 26. These surfaces and associated mechanical coupling means, for example a bolt fastener adapted to be inserted into aligned openings 27 and 28, accurately establish the axial, end-to-end, alignment of the two mandrel sections 10 and 11. Once this accurate alignment and coupling is achieved, an annular cavity 29 is established adjacent joint site 25–26. Ring-shaped member or head wheel 12 is freely positioned in cavity 29. The cross-sectional shape of member 12 conforms substantially to the cross-sectional shape of the cavity to thereby define a small air-bearing space interface, for example 0.001 inch, between the adjacent surfaces of member 12 and cavity 29.

An annular electric motor stator 30 is rigidly mounted on the circular boss 31 formed in end plate 32 of mandrel section 11. This motor stator magnetically cooperates, without physical engagement, with annular motor rotor 33. This rotor is rigidly carried in nonmovable fashion by head wheel 12. Electrical energization of stator 30 facilitates rotational movement of head wheel 12 about the mandrel's axis.

The outer cylindrical surface of head wheel 12 is accurately dimensioned to form a cylindrical extension of the tape receiving surface established by accurate alignment of mandrel portions 10 and 11.

Signal coupling means, in the form of two rotary transformers having rotors 34, 35 and stators 36, 37, respectively, facilitate the communication of an electrical signal between transducer 13 and external read/write circuitry, not shown. These transformers facilitate signal communication to transducer 13 with no physical contact between head wheel 12 and mandrel section 10.

The rotational speed of head wheel 12 is controlled by a speed control servomechanism, not shown, whose output controls the energization of motor stator 30. Speed measuring means in the form of a reflective optical tachometer provides a speed feedback signal to this speed servomechanism. Specifically, the optical tachometer includes an annular reflective pattern 40 which receives light ray from a source, not shown, carried by mandrel section 10 and causes pulses of light to be reflected onto a photocell 41. As is well known, reflective pattern 40 consists of a large number of alternate reflective and nonreflective areas which cause the output of photocell 41 to be an alternating signal whose frequency increases with the rotational speed of head wheel 12. Speed sensing means 40, 41 is of the type requiring no physical engagement between mandrel section 10 and head wheel 12.

Head wheel 12 is accurately supported in cavity 29 by fluid bearing means established by a plurality of blowing air orifices 42, 43. A plurality of the blowing air jets 43 establishes a radial or journal air bearing, whereas a plurality of blowing air jets 42 establishes opposing axial or thrust air bearings for head wheel 12. This hydrostatic air bearing reduces the head's tracking error, caused by nonrepeatable run-out of head wheel 12, to a matter of a few microinches. Design of the axial and radial air bearings is a procedure well known to those of skill in the art, and reference can be had to the publication, entitled "Gas Film Lubrication" by W. A. Gross, published by John Wiley and Sons, 1962, for a discussion of the design of such air bearings.

As is apparent from FIG. 3, the integration of the motor's rotor 33, the tachometer's rotor 40 and the rotary transformer's rotor 34, 35 into head wheel 12, such that no physical contact occurs between the head wheel and the mandrel, in combination with the hydrostatic air bearings, freely support the head wheel and provide very accurate and repeatable rotation of head wheel 12.

Motor 30, 33 is, preferably, a three-phase, eight-pole induction motor that has been turned inside out. Wound stator 30 is placed on the inside of rotating armature 33. The stator is clamped in a fixed position on mandrel section 11 and the rotor is attached directly to head wheel 12.

Transformers 34, 36 and 35, 37 consist of concentric ferrite rings. The outer rotor rings are physically attached to head wheel 12, as is the motor's rotor, whereas the transformer's concentric stator rings are attached in a fixed position on mandrel portion 10. The present invention, as shown in FIG. 3, provides two transformer sets, one providing read signals to transducer 13 and the other providing write signals to this transducer. Ideally, these rotary transformers have wide band, low signal level capability.

Figure 4:
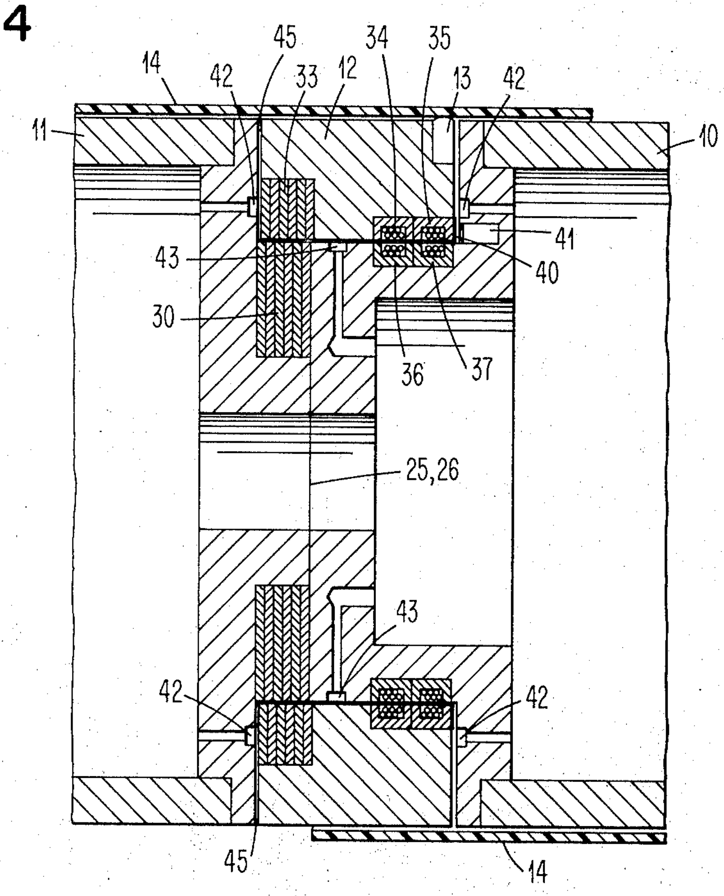
FIG. 4 is a longitudinal sectional view of the center portion of the apparatus of FIG. 1.

FIG. 4 shows the apparatus of FIG. 3 in assembled form and is a longitudinal section view of the center portion thereof. In this figure it can be seen that mandrel portions 10–11 and head wheel 12 are in accurate axial alignment and establish a tape wrap surface for tape 14. This figure shows a condition wherein a helical wrap is provided about the mandrel, as shown in FIG. 1. The air bearing interface 45 is shown in this figure and its size is exaggerated for clarity. The essence of the present invention is readily apparent from this figure. Namely, mandrel sections 10 and 11 are accurately aligned at joint side 25, 26 and establish a cavity which is occupied by head wheel 12, with an air bearing interface 45, such that rotational force, signal information and speed information are obtained for head wheel 12 with no physical contact thereto.

Figure 5:
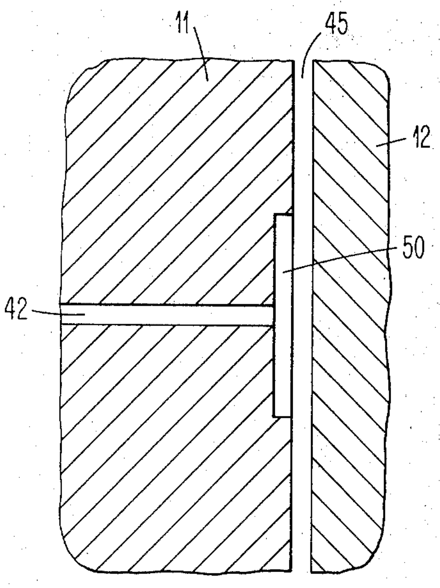
FIG. 5 is an enlarged view of one of the hydrostatic air bearing ports of FIGS. 3 and 4.

FIG. 5 is a greatly enlarged view of one of the hydrostatic air bearing ports 42 formed in mandrel portion 11 and cooperating with the air bearing interface 45 formed between that mandrel portion and a portion of head wheel 12. This particular air bearing port includes a recessed pocket or poll 50. In order to minimize both axial and radial movement or run-out of head wheel 12, the air bearing at each of the various ports 42, 43 must establish a relatively stiff air bearing. Bearing stiffness is an increasing function of the air supply pressure. Key considerations to the design of such an air bearing are to provide a pool whose diameter and depth are sufficient to avoid supersonic airflow into the pool from the supplying conduit or orifice, and yet minimum pool volume to avoid a condition termed "pneumatic hammering."

While orifice compensated, hole type air bearings are shown, the present invention is not to be limited thereo. For example, porous type bearings or compensated hole type bearings could be used.

Figure 6:
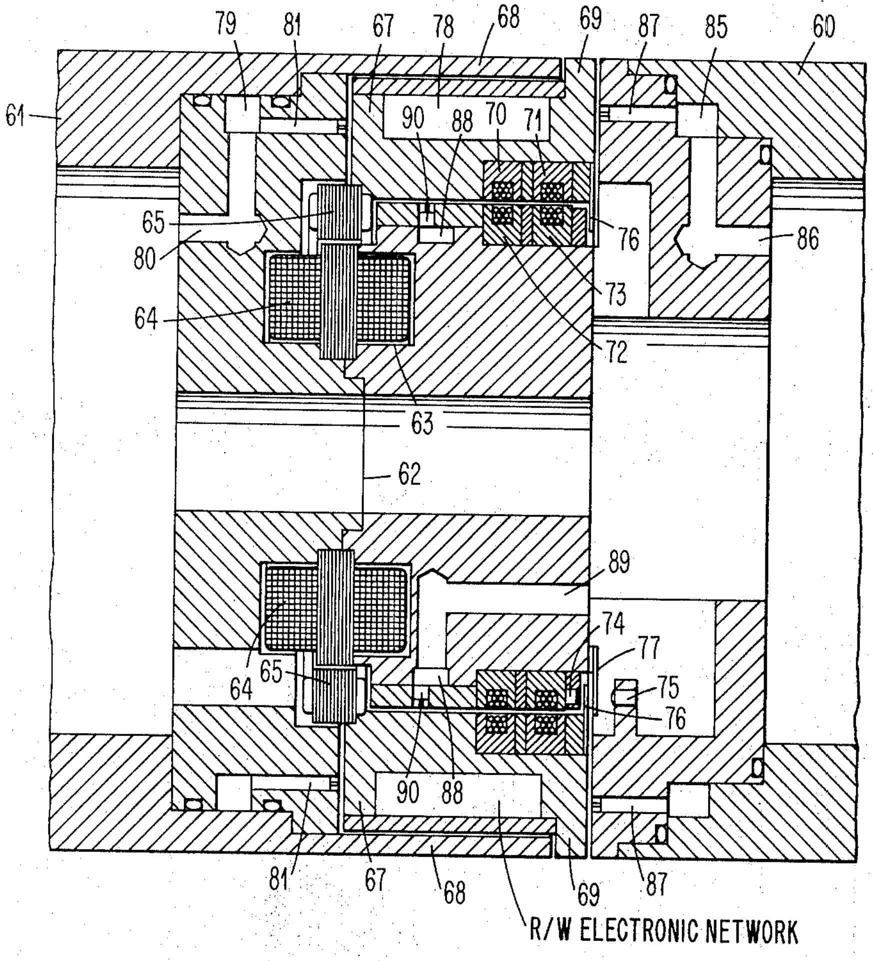
FIG. 6 is a view similar to FIG. 4, but showing a modified form of the present invention.

FIG. 6 is a view similar to FIG. 4, showing a modified form of the present invention. In this form of the invention, the two cylindrical mandrel sections 60 and 61 are positioned in accurate, end-to-end axial alignment by way of joint site 62. This joint site provides an annular cavity 63 which receives motor stator 64. Stator 64 is rigidly mounted in nonrotatable fashion within cavity 63. Cavity 63 includes a further portion which is adapted to receive rotor 65. Rotor 65 is rigidly fixed to head wheel 67 so as to rotate therewith in the annular cavity established at the joint site of mandrel sections 60 and 61.

In this embodiment, mandrel section 61 includes an annular skirt 68 which is separated from annular section 60 by a relatively narrow annular gap. This gap is occupied by the annular portion 69 of head wheel 67. Portion 69 of the head wheel carries one or more magnetic transducers, not shown.

As with the apparatus of FIGS. 3 and 4, head wheel 67 not only integrally supports motor rotor 65, but also supports the rotor portions 70 and 71 of a rotary signal transformer whose stators 72 and 73 are mounted in a fixed position relative to mandrel section 60.

The speed measuring means of FIG. 6 is provided by a see-through optical tachometer whose stationary light source 74 and stationary photocell 75 are separated by a movable annular tachometer disk 76 and a stationary tachometer mask 77.

Head wheel 67 is constructed and arranged to include an annular cavity 78. This cavity includes read/-write electronics or amplifiers, not shown, which interconnect signal transformer rotors 70 and 71 with the read/write magnetic transducer carried by the surface 69 of the head wheel.

Figure 7:
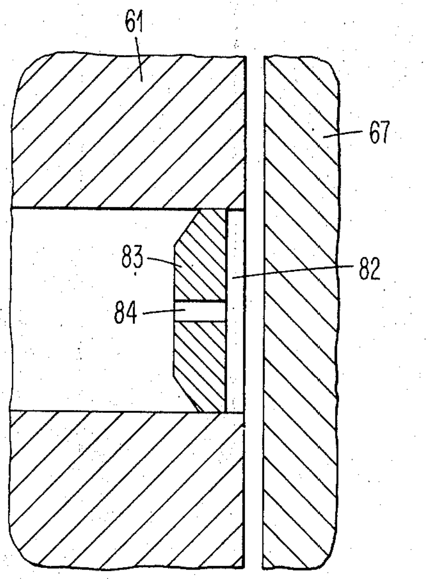
FIG. 7 is an enlarged view of one of the hydrostatic air bearing ports of FIG. 6.

Considering now the air bearing portion of the apparatus of FIG. 6, mandrel section 61 includes an annular cavity 79 which communicates with an air pressure supply port 80 to thereby supply pressurized air to hydrostatic air bearing ports 81 located at spaced positions about the circumference of the head wheel cavity established by mandrel members 60 and 61. Specifically, each of these hydrostatic air bearing ports is of the type shown in FIG. 7, wherein the bearing's pool 82 is established by a member 83 having an airflow orifice 84 formed therein.

Mandrel section 60 includes a similar annular cavity 85 which communicates with an air supply conduit 86 and supplies pressurized air to a number of hydrostatic air bearing ports 87 located about the circumference of the head wheel's cavity. In addition, mandrel section 60 includes a second annular cavity 88 which is connected to air supply conduit 89 and supplies pressurized air to a number of hydrostatic air bearing ports 90 which interface with the radial surface of the head reel's cavity.

In accordance with a further feature of the present invention, the electric motor, be it motor 30, 33 of FIGS. 3 and 4 or motor 64, 65 of FIG. 6, is an induction motor whose speed is servo controlled to be less than synchronous speed. As a result, the motor stator's rotating magnetic field travels at a speed which is faster than that of head wheel 12 or 67. The head wheel physically carries the secondary winding of a power transformer, as by winding a power transformer secondary winding intermingled with motor rotor 33, FIG. 3, or motor rotor 65, FIG. 6. The stator's magnetic field and this secondary winding provides operating power for further electrical means, for example the read/write electronic network of FIG. 6, carried by the head wheel.

Figure 8:
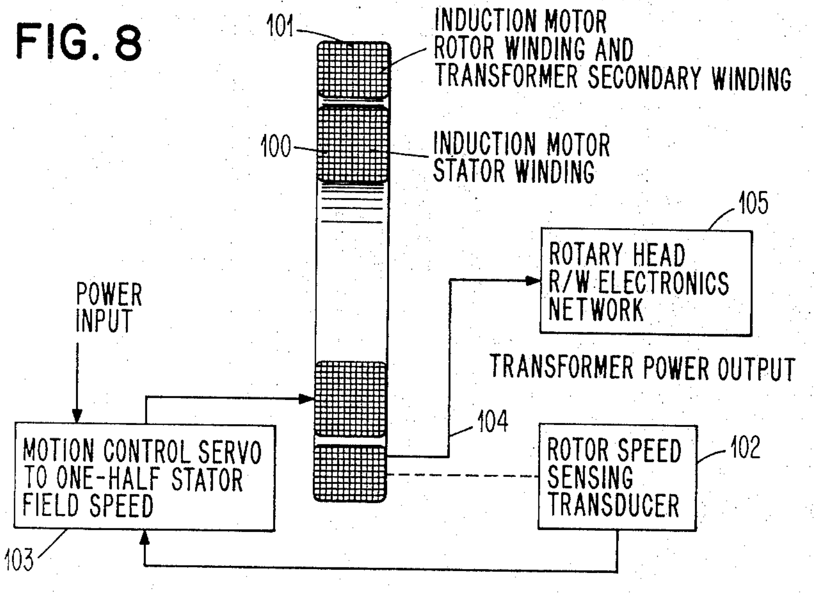
FIG. 8 is a schematic showing of the rotor's speed servo, and the use of the rotor's power transformer winding to supply operating power to the head wheel's read/write electronic network.

This feature of the present invention is shown in FIG. 8 where the inductive motor's stator winding 100 is schematically shown concentric with the inductive motor's rotor winding and transformer secondary winding 101. The rotor winding and secondary winding 101 are mounted on the head wheel and rotate therewith. A rotor speed sensing transducer 102 is driven by the head wheel and is connected to a motion control servo 103 to thereby control the rotational speed of stator 100 to be less than a synchronous speed, and for example, to be one-half of the speed of the stator's magnetic field. Electrical energy is induced in the power transformer secondary winding. This energy is supplied, by way of conductor 104, to the head wheel's read/write electronic network 105. Network 105 interconnects the head wheel's rotary transformer secondary winding and the magnetic transducer, as above described.

Specific apparatus for use in speed-controlling an induction motor are well known to those of ordinary skill in the art. By way of example, reference may be had to the McGraw-Hill Electrical and Electronic Engineering Series, and to the volume entitled Electric Machinery, second edition, by Fitzgerald & Kingsley, 1961.

While the invention has been particularly shown and described with reference to preferred embodiments thereof, it will be understood by those skilled in the art that various changes in form and details may be made therein without departing from the spirit and scope of the invention.

What is claimed is:

1. Rotating head apparatus adapted to support a wrap of magnetic recording tape, comprising:

a first and a second mandrel section having aligned portions of generally similar shape to define a tape supporting portion, said mandrel sections being coupled together by means including a joint site which defines an annular cavity adjacent said joint site, a motor stator fixed to said mandrel halves and cooperating with said cavity, a ring-shaped member freely positioned in said annular cavity, a motor rotor carried by said ring-shaped member so as to cooperate with said motor stator, a magnetic transducer carried by said ring-shaped member and generally positioned to move in alignment with the tape supporting portion defined by said mandrel halves, signal coupling means connected to said transducer and capable of communicating with said mandrel halves, and fluid supply means carried by said mandrel halves and supplying fluid to the interface between said annular cavity and said ring-shaped member to thereby hydrostatically support said member for rotation in said cavity, under the driving force of said motor rotor.

2. Rotating head apparatus as defined in claim 1 wherein said ring-shaped member has a cross section conforming substantially to the cross section of said annular cavity, and wherein said fluid supply means supplies fluid to the interface therebetween.

3. Rotating head apparatus as defined in claim 2 wherein said motor is a dynamoelectric device wherein said stator and rotor magnetically cooperate to produce rotation of said ring-shaped member.

4. Rotating head apparatus as defined in claim 3 wherein said signal coupling means couples signals to said transducer with no physical contact to said ring-shaped member.

5. Rotating head apparatus as defined in claim 4 including a speed measuring transducer having a first portion carried by said ring-shaped member and having a second portion carried in the wall of said cavity.

6. Rotary head apparatus as defined in claim 5 wherein said speed measuring transducer facilitates speed measurement of said ring-shaped member with no physical contact thereto.

7. Rotating head apparatus as defined in claim 2 wherein said motor is an induction motor, and including a speed sensing transducer operable to sense the speed of said ring-shaped member, a motor speed servomechanism controlled by said speed sensing transducer and operable to energize said motor stator to control the rotor speed to a value which is less than the rotational speed of the stator's magnetic field, a power transformer secondary winding carried by said ring-shaped member and magnetically coupled to the stator's magnetic field, and further electrical means carried by said ring-shaped member and energized by said power transformer secondary winding.

8. Rotating head apparatus as defined in claim 7 wherein said further electrical means includes electrical signal network means interconnecting said signal coupling means and said magnetic transducer.

9. A rotating head assembly comprising;

first and second mandrel portions coupled together so as to define a surface about which magnetic tape is adapted to be wrapped, said mandrel portions being constructed and arranged at the joint site thereof to define an annular cavity, a rotary member mounted in said annular cavity and rotatable therein, a magnetic transducer mounted on said rotary member and adapted to sweep a path across the tape, a signal transformer rotor electrically connected to said transducer and mounted on said rotary member, a signal transformer stator mounted on one of said mandrel portions adjacent said cavity, an electric motor rotor mounted on said rotary member, an electric motor stator mounted on one of said mandrel portions adjacent said cavity, and air bearing means radially and axially supporting said rotary member in said cavity.

10. The rotating head assembly defined in claim 9 wherein said electric motor is of the induction type.

11. The rotating head assembly defined in claim 10 including a speed measuring tachometer rotor mounted on said rotary member, and a tachometer stator mounted on one of said mandrel portions adjacent said cavity.

12. The rotating head assembly defined in claim 11 wherein said rotary member is hydrostatically supported in said cavity with no physical engagement thereto.

13. The rotating head assembly defined in claim 11 including, motor speed control means controlled by the output of said speed measuring tachometer stator and operable to control the speed of said induction motor rotor to a value which is less than synchronous with the stator's magnetic field, a power transformer secondary winding mounted on said rotary member and magnetically coupled to the stator's magnetic field, and further electrical means mounted on said rotary member and connected to receive operating power from said power transformer secondary winding.

14. The rotating head assembly defined in claim 13 wherein said further electrical means includes a signal processing network interconnecting said signal transformer rotor and said magnetic transducer.

15. A rotating magnetic head apparatus, comprising:

a pair of cylindrical mandrel halves coupled together coaxially and end-to-end so as to define a tube which is adapted to receive a wrap of magnetic tape, said mandrel halves being constructed and arranged at the joint site thereof to define an annular cavity which forms an annular gap between the outer surfaces of said mandrel halves so as to define a path across the tape, an annular head wheel of generally torus shape freely positioned in said annular cavity and having an outer circumferential surface which substantially fills the annular gap between the outer surfaces of said mandrel halves, magnetic transducer means carried by said head wheel and having a transducing interface generally coextensive with the outer surface of said head wheel, and fluid bearing means rigidly supporting said head wheel both axially and radially within said cavity.

16. A rotating head apparatus as defined in claim 15 including, an electric motor rotor carried by said head wheel and magnetically cooperating with a motor stator positioned so as to define a portion of said cavity.

17. A rotary head apparatus as defined in claim 16 including, a noncontact signal communicating means having a rotor carried by said head wheel and electrically connected to said magnetic transducer means, and having a stator positioned so as to define a portion of said cavity.

18. A rotary head apparatus as defined in claim 17 wherein said signal communicatng means is a rotary transformer.

19. A rotary head apparatus as defined in claim 17 including, a noncontact speed measuring transducer having a rotor carried by said head wheel, and having a stator positioned so as to define a portion of said cavity.

20. A rotary head apparatus as defined in claim 19 wherein said speed measuring transducer is an optical tachometer.

21. A rotary head apparatus as defined in claim 19 wherein the cross-sectional shape of said head wheel conforms substantially to the shape of said cavity, so as to define an interface gap therebetween, and wherein said fluid bearing means includes blowing air jets supplying pressurized air to said interface gap to thereby hydrostatically support said head wheel in said cavity.

22. A rotary head apparatus as defined in claim 19 wherein said electric motor is the induction type, and including, motor speed servo means controlled by the stator output of said speed measuring transducer, and operable to energize said motor rotor to maintain a head wheel rotational speed which is less than synchronous with the motor rotor's magnetic field rotational speed, a power transformer secondary winding carried by said head wheel and magnetically coupled to the motor rotor's magnetic field, and electrical means connected to receive operating power from said power transformer secondary winding.

23. A rotary head apparatus as defined in claim 22 wherein said electrical means includes signal processing means interconnecting the rotor of said signal communicating means and said magnetic transducer.

* * * * *